United States Patent [19]

Kohler et al.

[11] 3,842,246

[45] Oct. 15, 1974

[54] RECOGNITION AND IDENTIFICATION SYSTEM WITH NOISE REJECTION CAPABILITIES

[75] Inventors: Robert D. Kohler; David P. Sidlauskas, both of San Jose; Charles A. Walton, Los Gatos, all of Calif.

[73] Assignee: Proximity Devices, Inc., Sunnyvale, Calif.

[22] Filed: Sept. 27, 1973

[21] Appl. No.: 401,434

[52] U.S. Cl. .......................... 235/61.11 H, 340/152 T

[51] Int. Cl. .......................... G06k 7/08

[58] Field of Search. 235/61.11 D, 61.11 H, 61.7 B; 340/149 A, 152 T, 258 C; 343/6.5 SS, 6.8 R

[56] References Cited

UNITED STATES PATENTS

| | | | |
|---|---|---|---|
| 3,137,847 | 6/1964 | Kleist | 343/6.5 SS |
| 3,453,598 | 7/1969 | Schweizer et al. | 340/149 A |
| 3,521,280 | 7/1970 | Janco et al. | 343/6.5 SS |
| 3,671,721 | 6/1972 | Hunn et al. | 340/258 C |
| 3,707,711 | 12/1972 | Cole et al. | 340/258 C |
| 3,816,708 | 6/1974 | Walton | 235/61.11 H |

*Primary Examiner*—Stanley M. Urynowicz, Jr.
*Attorney, Agent, or Firm*—Schatzel & Hamrick

[57] ABSTRACT

An improved electronic recognition and identification system for recognizing and identifying the resonant frequency of a coded external passive network. The system comprises an active network including a sweep oscillator driving a sensing coil to generate an external electromagnetic field for inductive coupling to the passive resonant network when said passive network is brought within the proximity of the sensing coil, detector means for detecting variations in the signal across the sensing coil due to said passive network and for generating time base signals representative of the resonant frequency of the passive network, an internal reference signal generator network for generating reference signals representative of the reference identification frequency, a comparator network responsive to said detector and said reference signals for generating control signals indicative of coincidence or noncoincidence of the detector and reference signals, and noise rejection network responsive to noise signals generated from external or internal noise sources and adapted to inhibit operation of the system in the event noise signals are sensed.

12 Claims, 4 Drawing Figures

RECOGNITION AND IDENTIFICATION SYSTEM WITH NOISE REJECTION CAPABILITIES

BACKGROUND OF THE INVENTION

1. Field of the Invention

The present invention relates to an electronic recognition and identification system for recognizing and identifying coded objects and more particularly to a system including an active electrical network adapted to respond to the proximity of coded electronic passive circuits.

2. Description of the Prior Art

Electronic recognition and identification systems presently exist for various functions including portal control in which case the system functions as a lock and key system. For example, an individual may carry an electronic coded identification card (key) for presentation to a reading station when the individual desires to enter the portal. If the card carries the proper code, responsive identification control signals are generated in turn permitting opening of the door. Other applications include object identification wherein the object carries an identification card coded to identify the object. As the card passes a reading station, the code is read and responsive identification control signals generated. The identification signals may then be utilized to control processing equipment and the destination of the object. For example, U.S. Pat. No. 3,752,960 entitled "Electronic Identification and Recognition System" describes an identification and recognition system and patent application entitled, "Improved Electronic Recognition and Identification System," filed May 25, 1973, Ser. No. 363,851 by Charles A. Walton now U.S. Pat. No. 3,816,708 and assigned to the Assignee of the present application describes an improved recognition and identification system.

SUMMARY OF THE PRESENT INVENTION

With electronic recognition and identification systems it is desirable to provide a system capable of distinguishing coded signals from electrical noise signals. The reliability of the system is at least in part dependent on the ability to guard against false actuation responsive to noise signals.

The system may encounter electrical noise through either the external or internal networks. Noise frequency produces pulses which resemble or are equal to normally produced signals. The noise may be unintentionally and randomly produced, or it may be intentionally produced by an unauthorized person attempting to actuate the system but does not have the appropriate code.

The present invention provides an improved recognition and identification system adapted to distinguish coded signals from noise signals and avoid erroneous identification and actuation of the system. The present invention is further adapted to temporarily inhibit the generation of identification control signals in the event a noise signal is detected.

An exemplary embodiment of a system incorporating the present invention includes a passive electronic circuit having a coded resonant identification frequency and an active network for sensing the code and generating responsive identification control signals. The coded passive circuits serve as an identification card to be carried by an individual or object. The passive circuitry may have one or more coded resonant frequencies. The active network includes a sensing coil positioned to permit electromagnetic coupling with the passive circuit when the identification card is placed in close physical proximity to the sensing coil. The sensing coil is continuously excited by a radio frequency sweep oscillator source so as to continuously generate an electromagnetic field within the proximity of the sensing coil. The frequency of the field repetitively sweeps through the frequency range established by the oscillator. Due to mutual coupling, the responsive signal across the sensing coil responds when the sweep frequency coincides with a resonant frequency of the identification card and a perturbation is produced in a responsive signal across the sensing coil. This perturbation may take the form of an amplitude and/or phase shift in the responsive signal. A detector is tied to the sensing coil and is adapted to continuously detect the electrical condition of the sensing coil. Responsive to the perturbations, the detector generates condition digital signals received by a logic comparator network. The input to the logic comparator is further tied to an internal reference signal generator adapted to generate reference digital signals responsive to a second passive circuit. The logic comparator network, in response to the relative time relationship between the condition and reference digital signals, generates control signals. An "OK" control signal is generated when the signals match for a number of sweeps and a "NOT OK" control signal is generated when the signals do not match for a number of sweeps.

The system further includes a noise recognition network to distinguish electrical noise signals from intended generated external and internal signals. A pulse counter is tied to the detector responding to the external generated signals to count the externally generated pulses during each sweep of the oscillator. If, during any one sweep, the external counter counts more pulses than there are intended coded resonant frequencies on the coded passive card, an inhibit signal is generated. Also, the comparator network is adapted to provide an inhibit signal in the event a reference pulse signal is sensed without there being a correlating condition signal. Once an inhibit pulse is generated, the system is reset and no control signals are generated until the system passes through the select number of sweeps free of any noise.

Other embodiments and advantages will be apparent to those skilled in the art and in part pointed out hereinafter in the following description taken in connection with the accompanying drawings wherein there is shown by way of illustration and not of limitation a preferred embodiment of the invention.

DETAILED DESCRIPTION OF THE PREFERRED EMBODIMENT

Figure 1:
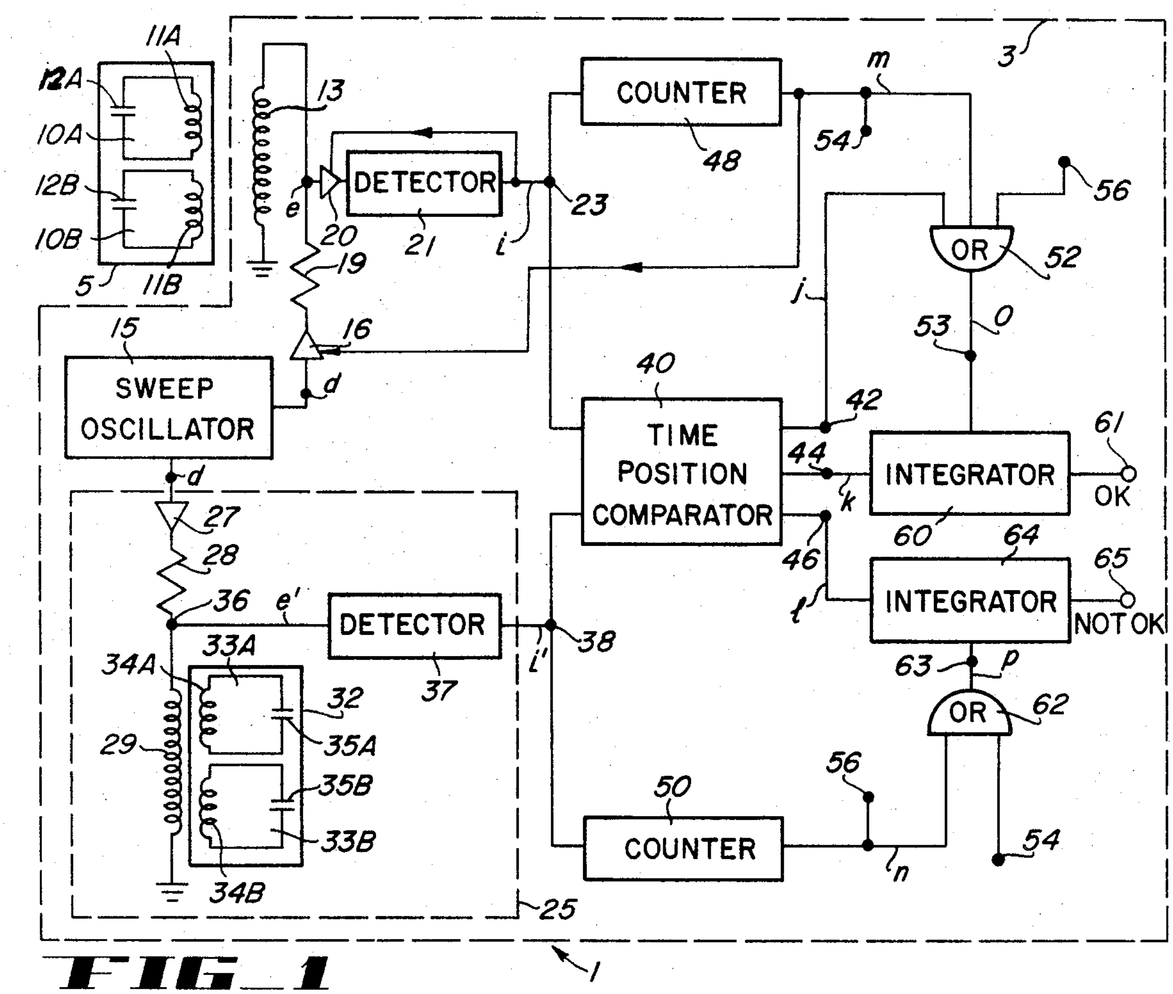
FIG. 1 is a block circuit diagram of an electronic identification and recognition system incorporating the present invention.

FIG. 1 diagramatically illustrates in block diagram form a recognition-identification system referred to by the general reference character 1 and incorporating the teachings of the present invention. The system 1 includes an active electrical signal generation network 3 and a coded passive electrical network 5. The passive network 5 is in the form of an identification tag carrying two electrical passive inductance-capacitance circuits 10A and 10B. The passive network 5 may be in the form of a card to be carried by an individual or attached to an object to be recognized and identified. The passive circuit 10A includes an inductor 11A and a capacitor 12A electrically joined to form an electrical resonant circuit of a resonant frequency $f_a$. The passive circuit 10B carries an inductor 11B and a capacitor 12B joined to form an electrical resonant circuit of a resonant frequency $f_b$. Thus, the passive circuit 5 has two coded resonant frequencies $f_a$ and $f_b$.

In operation, the inductors 11A and 11B function as a secondary of a transformer for inductive coupling to a sensing coil 13 of the active network 3. When the coil 13 is excited, it produces an electromagnetic field within a sensing zone proximate to the coil. Sensing coil 13 is excited with an alternating current stimulating signal "*d*" (See FIG. 4) originating with a radio frequency sweep oscillator 15. The stimulating signal d repeatedly sweeps over a frequency range of $f_1$ to $f_{10}$. The frequency range $f_1$ to $f_{10}$ includes the frequencies $f_a$ and $f_b$. Signal *d* is fed to an isolation adjustable gain amplifier 16 joined in series with an impedance element 19 and the sensing coil 13. Amplifier 16 and impedence element 19 are incorporated to provide a high output impedence and isolate the oscillator 15 from the effects influencing the coil 13 which may otherwise disturb the oscillator operation. Impedence 19 may take the form of specific circuit element, such as an inductor or resistor, or may be the natural output impedence from the amplifier 16. Amplifier 16 may have its gain varied by another signal path, as hereinafter further explained.

As the sweep oscillator 15 sweeps through the frequency range $f_1$ to $f_{10}$ and delivers the stimulating signal *d* to the coil 13, a varying frequency electromagnetic field is generated within the exterior sensing zone proximate to the coil 13. As the passive electrical circuit 5 is moved within the sensing zone proximate to the sensing coil 13 and inductively coupled therewith, the electromagnetic field from the coil 13 stimulates resonant responses in the circuits 10A and 10B. The load and resonants of the circuit 5 are reflected across the sensing coil 13 in the form of a reflected signal which mixes with the original stimulating signal. At the sweep frequencies of the signal *d* coinciding with the resonant frequencies $f_a$ and $f_b$ of the passive circuits 10A and 10B, the mixing causes perturbations in the potential across the sensing coil 13. These perturbations may be in the form of phase shifts and/or amplitude level changes at the resonant frequencies $f_a$ and $f_b$ as indicated by the responsive envelope wave form "*e*" of FIG. 4. These perturbations in signal *e* repeatedly occur as the signal *d* passes through the resonant frequencies and the passive circuit 5 is within the sensing zone.

The signal envelope *e* thus functions as the primary signal carrying the information which permits recognition and identification of the passive network 5. To further process the signal *e* and capture the coded information contained therein, the signal is sensed at the junction of the resistor 19 and coil 13 and fed through a variable gain amplifier 20 to a detector stage 21. The detector stage 21 responds to the positive and negative amplitude variations in the signal *e* and amplifies and converts the variations to a signal train of condition digital pulses "*i*". The signal train *i* appears at the output terminal 23 of the detector stage 21. The timing of the signal *i* within the sweep oscillator time period thus represents the frequency of the sweep signal *d* corresponding to the resonant frequencies $f_a$ and $f_b$ of the circuits 10A and 10B. The output of the detector 21 is also sensed by the variable gain amplifier 20. The condition pulse signal increase in amplitude as the key 5 is brought closer to sensing coil 13. There is also a tendency for the pulses *i* to become wider when the key is very close to the sensing coil, and also a tendency for pulse distortion to occur when the signal is very strong. The feedback path is used to sense the increased level, and vary the gain of amplifier 20 in such a way as to reduce the amplification in the presence of strong signals, and consequently reduce the distortion caused by the proximity of the identification card 5 to the sensing coil 13.

The sweep oscillator 15 is further connected to an internal reference signal generating network indicated in the broken line block 25. The sweep signal *d* is received by an isolation amplifier 27 joined in series with an impedance 28 and a sensing coil 29. An internal reference electromagnetic field is generated within an internal sensing zone proximate to the coil 29. A passive electrical network 32 in a form analogus to the passive circuit 5 carries a pair of passive tuned circuits 33A and 33B. The circuit 33A includes an inductance 34A and a capacitor 35A joined in series. Circuit 33B includes an inductance 34B and a capacitor 35B joined in series. The values of the inductors 34A and 34B and capacitors 35A and 35B are selected such that the circuits 33A and 33B have resonant reference frequencies $f_{a_1}$ and $f_{b_1}$. A reference radio frequency signal envelope *e'* (See FIG. 4), responsive to the reference frequencies and proximity of the passive circuit 32, is developed across the sensing coil 29 and may be taken at a junction 36. Signal envelope *e'* takes a format similar to that of the signal e with the perturbations occurring at the resonant frequencies $f_{a_1}$ and $f_{b_1}$. In operation, the stimulating signal *d* repeatedly sweeps through the range $f_1$ to $f_{10}$ and perturbations occur in the signal *e'* at frequencies $f_{a_1}$ and $f_{b_1}$. If $f_{a_1}$ and $f_{b_1}$ of the internal passive network 32 are the same as $f_a$ and $f_b$ of the external passive network 5, the perturbations in the signals *e* and *e'* occur simultaneously.

The output signal *e'* is received by a detector 37. Detector 37, which may be similar to detector 21, strips away the radio frequency signals of the envelope *e'* and converts the positive and negative perturbations to a primary reference condition signal train *i'* appearing at the output terminal 38 of the detector 37 and internal reference signal generator network 25. The timing of the pulses in the train *i'* represents the frequency of the sweep signal *d* corresponding to the resonant frequencies $f_a$ and $f_b$ of the reference circuits 33A and 33B.

Figure 4:
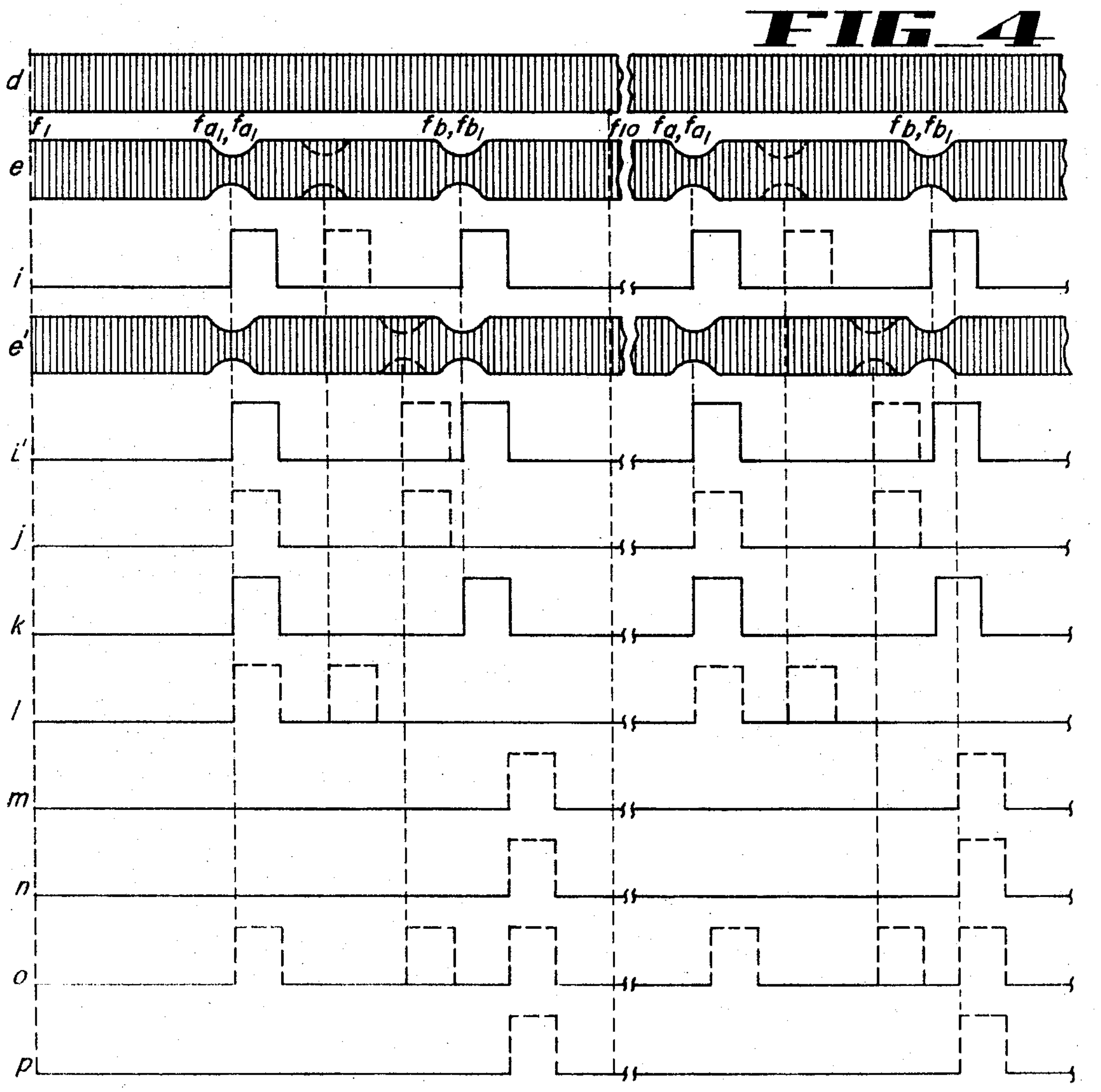
FIG. 4 is a graphical representation of the waveshapes of various signals encountered in the system of FIG. 1.

The output condition digital pulse train *i* at the terminal 23 and the reference pulse train *i'* appearing at the terminal 28 are respectively received at input terminals of a time position comparator 40. Comparator 40 is adapted to compare the relative time position of the pulses $i$ and $i'$ and generate three possible output signals indicative of the comparison. At an output terminal 42 the comparator 40 generates a signal in the event that the internal reference pulse $i'$ appears when there is not a corresponding condition pulse signal. This signal may be represented by the signal "$j$" illustrated in phantom in FIG. 4. The condition of the existence of an internal reference pulse $i'$ without a corresponding pulse $i$ may exist when the code of the external passive card 5 does not match that of the internal passive card 32. Referring to FIG. 4, if the coded resonant frequency on card 5 is non-existent or comes within a frequency between $f_a$ and $f_b$, as illustrated in phantom of the signals $e$ and $i$, then there would not be a signal $i$ occurring simultaneously with frequency $f_a$. However, there is a pulse $i'$ occurring at the time $f_a$ and thus the signal $j$ appears at the output terminal 42 and is generated at the time corresponding to $f_a$. Also, it is possible that the codes of the passive circuits 5 and 32 match but that an additional resonance (e.g. noise) is detected in the reference system 25. This results in additional pulses being generated in the signal train $i'$ during a sweep between $f_1$ and $f_{10}$. Under these conditions, a pulse $j$ will appear at the terminal 42 responsive to each of the additional internally generated pulses. This is illustrated in FIG. 4 wherein a perturbation in the signal $e'$ is illustrated in phantom between frequencies $f_{a_1}$ and $f_{b_1}$. The signal $i'$ is further illustrated with an additional pulse responsive to said perturbation and the signal $j$ is indicated in phantom with the solid-line horizontal.

A signal appears at an output terminal 44 of the comparator 40 when there is time coincidence between the condition pulse $i$ and the internal reference signal $i'$. Time coincidence of signals $i$ and $i'$ and generation of signal $k$ occurs when the coded resonant frequency of external circuit 5 matches that of the internal reference circuit 32. FIG. 4 illustrates this condition by illustrating pulses $i,i'$ and $k$ in solid lines and in timing alignment.

A signal appears at an output terminal 46 of the comparator 40 in the event that there is a condition pulse signal $i$ without a corresponding internal reference pulse signal $i'$. This signal may be represented by the signal "$l$", illustrated in phantom in FIG. 4. The condition of the existence of an external (condition) pulse $i$ without a corresponding internal reference pulse $i'$ may exist when the code of external passive circuit 5 does not match that of the internal passive card 32, or if there is a source of noise originating from an internal source. Referring to FIG. 4, if a resonance is indicated from the internal network, and occurs between $f_{a_1}$ and $f_{b_1}$, as illustrated in phantom of the signals $e'$ and $i'$, but the circuit 5 resonance occurs at $f_a$, then there would be a signal $l$ occurring simultaneously with frequency $f_a$ indicating that there is a resonant frequency or noise in the external circuit without a corresponding resonance in the internal circuit. Also, it is possible that the codes of the passive circuits 5 and 32 match, but that there is an additional response (e.g. noise, or a card 5 with three or more resonant frequencies) detected. This results in additional pulses being generated in the signal train $i$ during a sweep between frequencies $f_1$ and $f_{10}$. Under these conditions, a pulse 1 will appear at the terminal 46 responsive to each of the additional externally generated pulses. This is illustrated in phantom between frequencies $f_a$ and $f_b$. The signal $i$ is further illustrated with an additional pulse responsive to said perturbation and the signal $l$ is indicated in phantom with the solid-line horizontal.

Also common to the terminal 23 is a counter 48 adapted to count the number of pulses in a signal train $i$ during each sweep of the oscillator 15. Similarly common to the output terminal 38 is a counter 50 adapted to count the number of pulses in the train $i'$ during each sweep of the oscillator 15. The counters 48 and 50 are selected to produce an output signal in the event the number of counted pulses during any one sweep exceed the number of coded resonant frequencies on the passive circuit 5 or/and the passive card 32. In the illustrated embodiment, the passive card 5 has two reference frequencies $f_a$ and $f_b$ and the coded card 32 has two reference frequencies $f_{a_1}$ and $f_{b_1}$. Accordingly, in the event the pulse train $i$ indicates two pulses during the sweep, there is no output signal generated by the counter 48. However, in the event there are three or more pulses generated during any sweep, an excessive count signal "$m$" appears at the output of the counter 48. Signal $m$ indicates that during the sweep there were three or more pulses from the external source and that noise is externally being generated. The noise may be due to an attempt to actuate the system with spurious noise. To guard against the situation that the surroundings are temporarily noisy due to the environment, the output of the counter 48 is tied to a feedback line extending to the input of the variable gain amplifier 16. If there is much noise present in the surroundings, for example, in an area where there is a great deal of electronic transmitting equipment, and this noise manifests itself as extra counts in counter 48, the feedback path to amplifier 16 is energized and causes the gain of amplifier 16 to increase. Increasing the gain of amplifier 16 results in increasing the excitation level to sense coil 13. With higher excitation, the response of the key 5 is increased, and the signal-to-noise ratio is increased. Therefore, there is an improved degree of recognition of the correct key 5 in the presence of noise. It is not desirable to keep the sense coil excitation at a high level in the absence of noise because under low-noise conditions the higher level may interfere with other radio frequency apparatus.

The output of the counter 48 is also common to a logic OR gate 52 and to a terminal 54. OR gate 52 is also common to the output terminal 42 of the time position comparator 40. The third input terminal 56 of the OR gate 52 is common to the output of the counter 50. The counter 50 is similar to the counter 48 and generates an output signal "$n$" if during any given sweep of the oscillator 15 the number of pulses in the signal train $i'$ exceeds two. If the pulse train $i'$ indicates two pulses during the sweep, there is no output signal generated. However, if three or more pulses are generated during any sweep, the signal $n$ appears. Signal $n$ indicates that during the sweep there was internal noise generated. Thus, OR gate 52 is sensitive to the signals $j$, $m$ and $n$ and generates an output discharge signal "$o$" in the event any one or more of the signals appear.

OR gate 52 has an output terminal 53 connected to an integrator network 60 which is also common to the output terminal 44. The integrator 60 is adapted to generate an OK control signal at an output terminal 61 responsive to signal $k$ indicating coincidence between the pulse trains $i$ and $i'$. Coincidence between the trains $i$ and $i'$ generally indicates that passive card 5 has been recognized and identified to coincidence with the internal reference code 32. The integrator 60 is such that an OK control signal is not generated until after a pulse $k$ is generated during several successive sweeps. However, in the event that there are noise signals and the OR gate 52 recognizes such then the signal 0 is adapted to discharge the integrator 60, reset it and inhibit it from generating an OK control signal during the existence of the noise. This in turn provides assurance that the passive card 5 was not erroneously identified and recognized, e.g. a card carrying several resonant frequencies two of which happened to match $f_a$ and $f_b$. At the same time, if the signal 0 was due to a momentary noise source, the integrator is only momentarily delayed in generating the OK control signal.

The counter 50 also extends to one terminal of an OR gate 62 which is also common to the output terminal 54. Accordingly, OR gate 62 generates an output signal "$p$" responsive to the existence of either an excessive count signal $n$ or $m$. An output terminal 63 of OR gate 62 is common to an integrator 64 which is common to the output terminal 46 of the time condition comparator 40. Integrator 64 is included to generate a warning NOT OK control signal at an output terminal 65 in the event there are pulses within the pulse train $i$ without there being coinciding pulses in the reference signal train $i'$. This condition is normally indicative that an improperly coded card 5 is being utilized in an attempt to actuate the system, and therefore it is desirable to generate a warning. However, in the event that there are excessive counts being made indicative that there is external or/and internal noise present, the OR gate 62 responds to the excessive count signals $m$ and $n$ to discharge the integrator 64 and inhibit it from generating a NOT OK control signal. In this latter event, no control signals are generated and both integrators 60 and 64 are "dumped" or inhibit until the noise source is cleared.

Figure 2:
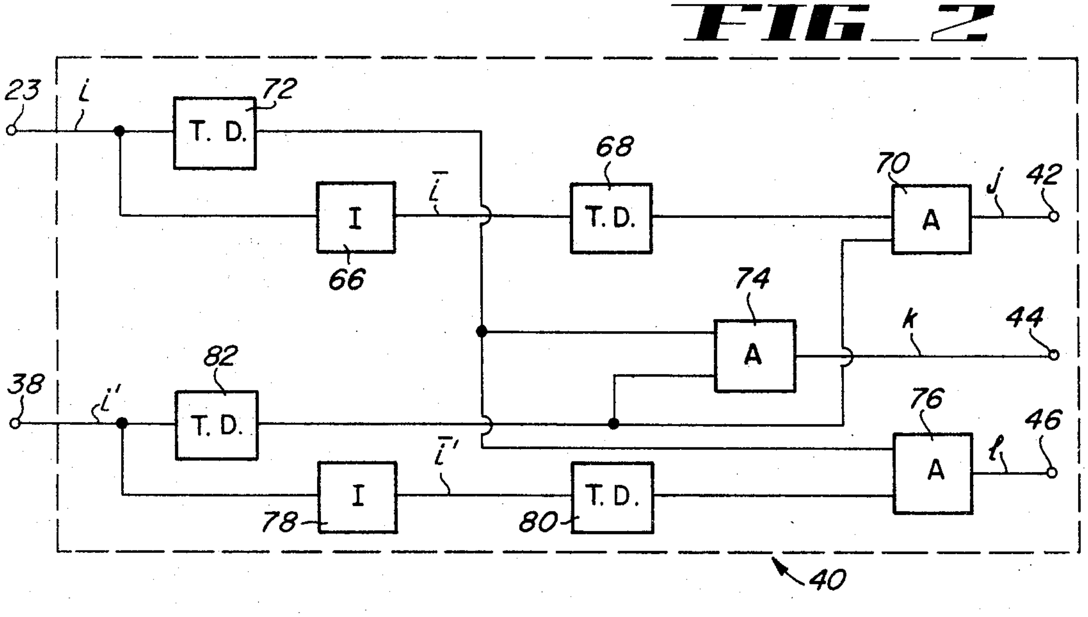
FIG. 2 is a circuit diagram illustrating a time position comparator of the system of FIG. 1.

FIG. 2 illustrates a circuit diagram for a time position comparator 40. The input common to the terminal 23 is tied to an inverter 66 to invert the condition signal train $i$ which is in turn delivered to a time delay 68 extending to an AND gate 70. The signal $i$ at the terminal 23 is also received by a time delay 72 which is common to the input of an AND gate 74 and an AND gate 76. The reference signal train $i'$ at the terminal 38 is delivered to an inverter 78 to invert the signal $i'$ and deliver it to a time delay 80 joined in series with the AND gate 76. Input terminal 38 is also common to a time delay 82 which is tied in series to the input of both the AND gates 70 and 74. The output terminal 42 wherein the signal $j$ appears is common to the output of the AND gate 70; the output terminal 44 where the signal $k$ appears is common to the output of the AND gate 74; and the output terminal 46 where the signal $l$ appears is common to the output of the AND gate 76.

In operation, the inverter 66 does not provide an output signal unless there is the absence of an $i$ signal. Similarly, the inverter 78 does not provide an output signal unless there is the absence of an $i'$ signal. Accordingly, the AND gate 70 conducts only when there is the $i'$ signal and the absence of a $i$ signal. Similarly, the AND gate 76 conducts only when there is the $i$ signal and the absence of an $i'$ signal. The AND gate 74 generates a signal $k$ only when there is a simultaneous existance of the condition signal $i$ and the reference signal $i'$. The time delay circuits 68, 72, 80 and 82 are included to delay the rising edge of the signals to compensate for the practical situation where the condition signals $i$ and the reference signals $i'$ are not exactly equal in time position. According, the use of time delay circuits which are adapted to delay the rising edge of the signal by a small amount, e.g. 30 percent of the pulse width will compensate for misregistration without causing generation of spurious $j$ or $l$ signals.

Figure 3:
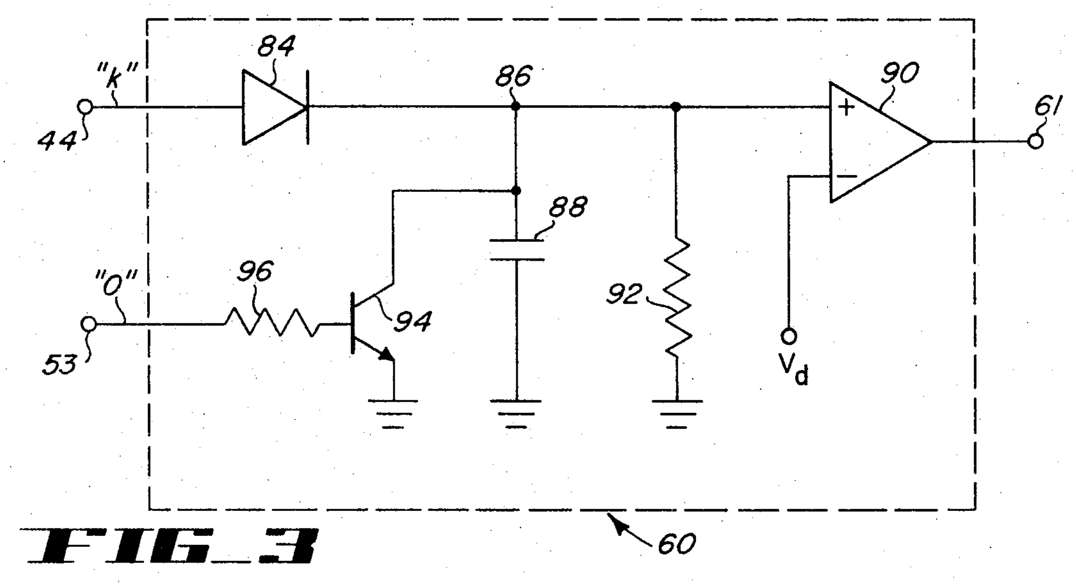
FIG. 3 is a circuit diagram illustrating an integrator of the system of FIG. 1.

FIG. 3 illustrates a circuit diagram for an integrator 60. The integrator 64 may take the same form as the integrator 60 and for purposes of clarity only the integrator 60 will be illustrated and described. The input to the integrator 60 is common to the terminals 44 and 53 to receive the signals $k$ and $o$ respectively. A unidirectional conductive device in the form of a diode 84 is connected with its anode common to the terminal 44 and its cathode common to a junction 86. A capacitor 88 extends to ground reference from the junction 86. Also the positive side of an amplifier 90 and one side of a resistor 92 are common to the junction 86. The negative side of the amplifier 90 is tied to a fixed threshold voltage $V_d$ such that only when the potential on the positive side of the amplifier exceeds the threshold value does the amplifier generate a signal at its output terminal common to the output terminal 61. This level is only achieved after repetative signals $k$ have charged the capacitor 88 to the necessary value. Extending across the capacitor 88 is a control valve in the form of a transistor 94 with the collector tied common to the terminal 86 and the emitter tied to ground reference. The base of the transistor 94 is tied in series with a resistance 96 and to the terminal 53. Accordingly, when a signal o is sensed, the transistor 94 conducts so as to discharge the capacitor 88. Once a signal $o$ appears, the capacitor 88 is at least partially discharged. Then the integrator only generates an output signal at the terminal 61 after the capacitor 88 has recharged to the necessary value by further "$k$" signals. Accordingly, so long as there is a signal $o$ generated, the capacitor 88 inhibits there being a control signal generated at the output terminal 61.

For some applications it may not be necessary to inclwde the counter 50 or the OR gate 62. In such an embodiment, the signal $j$ still represents the condition where there are internal reference signals $i'$ without coinciding condition signals $i$. In this event, a signal $o$ is generated and the OK integrator 60 is discharged. Various categories of noise or improper insertion of signals into the internal system will result in dumping (discharging) the OK integrator 60. For these applications where it is not necessary to also dump the integrator 64 responsive to the excessive count responsive to the noise, the counter 50 and OR gate 62 are not needed. In the event an unauthorized passive circuit is used in the external sensing zone to actuate the system, a responsive signal $l$ will be developed at the terminal 46. As previously described, signal $l$ represents the situation of a condition signal $i$ without a corresponding reference pulse $i'$ which is the situation when an improperly coded key 5 is being used. The signal $l$ enters the integrator 64 and causes a NOT OK control (warning) signal at the terminal 65.

Accordingly, there has been herein described a recognition and identification system adapted to detect noise and inhibit the generation of control signals in the event noise is detected. Such a system provides assurance against generation of control signals in the event the noise signals originate externally or internally. At the same time, the system rejects all codes which are not of the value and number of resonant frequencies coinciding with the reference.

While, for the sake of clearness and in order to disclose the invention so that the same can be readily understood, specific embodiments have been described and illustrated, it is to be understood that the present invention is not limited to the specific means disclosed. They may be embodied in other ways that will express themselves to persons skilled in the art. It is believed that this invention is new and also the changes which come within the scope of the following Claims are to be considered as part of the invention.

We claim:

1. An improved electronic recognition and identification system for identifying electrically coded passive objects and generating control signals responsive to the code of the passive objects recognized, the system comprising a coded external passive electrical identification object having a coded resonant frequency and adapted to be brought within an external sensing zone;

an active electrical signal generation network including a first sensing coil, frequency signal source means repeatedly sweeping through a range of frequencies and joined to said sensing coil to excite said first sensing coil and produce electromagnetic field signals within said external sensing zone for inductive coupling with the external passive object when said object is within said external sensing zone, first detector means engaged to said sensing coil for detecting perturbations in the envelope of the signal across said first sensing coil as the frequency of said electromagnetic field in said external sensing zone approaches said coded resonant frequency of the external passive object and producing condition pulse signals responsive to the time of said perturbations;

an internal sweep reference signal generator means adapted to produce reference pulse signals of a predetermined timing during each sweep;

time position comparator means engaged to said detector means and said reference signal generator means for receiving said condition pulse signals and said reference pulse signals and generating a first comparator signal in the event there is time coincidence between said condition pulse signals and said reference pulse signals and a second comparator signal if said reference pulse signals are not coincident with said condition pulse signals; and a first integrator network having input terminal means engaged to said comparator means for receiving said first and second comparator signals, said first integrator being adapted to generate a first output control signal responsive to a succession of said first comparator signals and to inhibit generation of said first control signal responsive to the existence of said second comparator signals.

2. The improved electronic recognition and identification system of claim 1 wherein the active electrical signal generation network further includes first adjustable gain amplifier coupled between said first sensing coil and the input of said first detector, the input of said first adjustable gain amplifier being further coupled to the output of said first detector means whereby the gain of said first adjustable gain amplifier is responsive to the output of said first detector means.

3. The improved electronic recognition and identification system of claim 1 further including a first pulse counter means engaged to said detector means for counting the number of condition pulses during each sweep of the frequency signal source means and comparing the number of condition pulses per sweep relative to a preset number coinciding with the number of reference pulses per sweep, said first counter means producing a first excessive count signal if the number of condition pulses during a sweep exceed the preset number, and said first integrator network being engaged to said first pulse counter means and adapted to inhibit generation of the first control signal responsive to a said first excessive count signal.

4. The improved electronic recognition and identification system of claim 3 further including a second adjustable gain amplifier coupled between said frequency signal source and said first sensing coil, the input of said second adjustable gain amplifier being further coupled to the output of said first pulse counter means whereby the gain of said second adjustable gain amplifier is responsive to the output of said first pulse counter.

5. The improved electronic recognition and identification system of claim 3 further including a first logic OR gate with the input engaged to said first pulse counter means and to said comparator to receive said first excessive count signal and said second comparator signal, the output of said first gate being engaged to said first integrator network to generate a first inhibit signal to inhibit said first integrator network from generating the first control signal if either a first excessive count signal or a second comparator signal is received by said first OR gate.

6. The improved electronic recognition and identification system of claim 1 wherein the time position comparator means generates the first, the second and a third comparator signals, the first comparator signal being generated responsive to time coincidence between said condition signals and said reference signal, the second comparator signal being generated responsive to the existence of a reference pulse and the absence of a condition pulse and the third comparator pulse signal being generated responsive to the existence of a condition pulse and the absence of a coinciding reference pulse; and including a second integrator network having input terminal means engaged to said comparator means for receiving said third comparator signal, said second integrator being adapted to generate a second output signal responsive to a succession of said third comparator signals.

7. The improved electronic recognition and identification system of claim 6 further including a first pulse counter means engaged to said detector means for counting the number of condition pulses during each sweep of the frequency signal source means and comparing the number of condition pulses per sweep relative to a preset number coinciding with the number of reference pulses per sweep, said first counter means producing a first excessive count signal if the number of condition pulses during a sweep exceed the preset number; and said first integrator network being engaged to said first pulse counter means and adapted to inhibit generation of the first control signal responsive to a said first excessive count signal.

8. The improved electronic recognition and identification system of claim 7 further including a second pulse counter means engaged to said reference signal generator means for counting the number of reference pulses during each sweep of the frequency signal source means and comparing the number of reference signal pulses per sweep relative to the preset number, said second pulse counter producing a second excessive count signal if the number of reference pulses during a sweep exceed the preset number; and said second integrator network being engaged to said second pulse counter means and adapted to inhibit generation of the second control signal responsive to a said second excessive count signal.

9. The improved electronic recognition and identification system of claim 8 further including a first logic OR gate with the input engaged to said first pulse counter means and to said comparator to receive said first excessive count signal and said second comparator signal, the output of said first gate being engaged to said first integrator network to generate a first inhibit signal to inhibit said first integrator from generating the first control signal if either a first excessive count signal or a second comparator signal is received by said first OR gate.

10. The improved electronic recognition and identification system of claim 9 further including a second logic OR gate with the input engaged to said first and second pulse counter means, the output of said second gate being engaged to said second integrator network to generate a second inhibit signal to inhibit said second integrator network from generating the second control signal if either said first or said second excessive count signal is received by said second OR gate.

11. The improved recognition and identification system of claim 10 wherein the first logic OR gate is further engaged to said second pulse counter means to receive said second excessive count signal and generate said first inhibit signal if said second excessive count signal is generated.

12. The improved recognition and identification system of claim 1 wherein a second integrator network generates a second output control signal responsive to a succession of said second comparator signals.

* * * * *